(12) United States Patent
Singh et al.

(10) Patent No.: US 6,790,899 B2
(45) Date of Patent: Sep. 14, 2004

(54) METHOD FOR MAKING FIRE-RETARDED POLYCARBONATE AND RELATED COMPOSITIONS

(75) Inventors: Rajendra K. Singh, Evansville, IN (US); Ye-Gang Lin, Evansville, IN (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 10/065,545

(22) Filed: Oct. 29, 2002

(65) Prior Publication Data

US 2004/0082691 A1 Apr. 29, 2004

(51) Int. Cl.[7] .............................. C08F 2/16; C08K 5/42
(52) U.S. Cl. ...................... 524/460; 524/161; 524/165; 524/166; 252/400.2; 252/400.21; 252/400.24
(58) Field of Search ................................ 524/160, 161, 524/165, 166; 252/400.2, 400.21, 400.24

(56) References Cited

U.S. PATENT DOCUMENTS

| | | | |
|---|---|---|---|
| 3,775,367 A | 11/1973 | Nouvertne | 260/45.9 R |
| 3,933,734 A | 1/1976 | Mark et al. | 260/45.7 S |
| 3,971,756 A | 7/1976 | Bialous et al. | 524/157 |
| 4,028,297 A | 6/1977 | Webb | 260/27 |
| 4,104,253 A | 8/1978 | Mark | |
| 4,110,299 A | 8/1978 | Mark | 260/37 PC |
| 4,130,299 A | 12/1978 | Wygant | 260/29.1 SB |
| 4,201,832 A * | 5/1980 | Hall et al. | 428/412 |
| 4,303,575 A | 12/1981 | Reinert | 260/45.8 A |
| 4,335,038 A | 6/1982 | Thomas | 524/188 |
| 4,552,911 A | 11/1985 | Cohnen et al. | 524/94 |
| 4,916,194 A | 4/1990 | Policastro et al. | 525/433 |
| 5,218,027 A | 6/1993 | Smith et al. | 524/265 |
| 5,508,323 A | 4/1996 | Romenesko et al. | 523/212 |
| 6,353,046 B1 | 3/2002 | Rosenquist et al. | 524/267 |
| 6,462,111 B1 | 10/2002 | Singh et al. | |

* cited by examiner

Primary Examiner—Kriellion A. Sanders
(74) Attorney, Agent, or Firm—Oppedahl & Larson LLP

(57) ABSTRACT

A combination of a potassium salt of a perfluoroalkane sulfonate and a sodium salt of toluene sulfonic acid, preferably in the presence of an antidrip agent to provide high melt strength, act synergistically to provide flame-retarded polycarbonate compositions at low levels. Thus, a flame-retarded polycarbonate resin can be made by adding to the polycarbonate resin an effective flame-retardant amount of a potassium salt of a perfluoroalkane sulfonate and a sodium salt of toluene sulfonic acid. The two salts may be formulated in advance into an additive composition.

75 Claims, No Drawings

METHOD FOR MAKING FIRE-RETARDED POLYCARBONATE AND RELATED COMPOSITIONS

BACKGROUND OF INVENTION

This application relates to a method for imparting fire-retardant properties to polycarbonate resins, to compositions useful in the method, and to fire-retarded polycarbonate resins of the type produced by the method. The fire-retarded polycarbonates are suitably used to make molded articles, particularly thin-walled articles.

Because of their strength and clarity, polycarbonate resins have a great many significant commercial applications. Unfortunately, polycarbonate resins are inherently flammable and can drip hot molten material causing nearby materials to catch fire as well. Thus, in order to safely utilize polycarbonates in many applications it is necessary to include additives which retard the flammability of the material and/or which reduce dripping. The challenge is to identify additives which accomplish this purpose without compromising the desirable properties of strength and clarity, without introducing new problems (such as the potential environmental problems associated with some halogenated additives) and without prohibitively increasing the price.

A variety of different materials have been described for use in producing fire-retarded and/or drip-resistant polycarbonates. Exemplary of these are the materials described in U.S. Pat. Nos. 3,971,756, 4,028,297, 4,110,299, 4,130,530 4,303,575, 4,335,038, 4,552,911, 4,916,194, 5,218,027 and 5,508,323. Notwithstanding these varied disclosures, however, there remains room for improvement in the formulation of firepolycarbonate resin.

Among the additives which are widely used commercially in fire-retarded polycarbonate resin compositions are organic salts, particularly sulfonic acid salts. Particular examples of these salts are perfluoroalkane sulfonates, such as potassium perfluorobutane sulfonate ("KPFBS", also known as "Rimar salt") and potassium diphenylsulfone sulfonate ("KSS") yield haze free compositions when blended with polycarbonate resin. The use of perfluoroalkane sulfonates in polycarbonate resins is described in U.S. Pat. No. 3,775,367. However, the benefits which can be obtained using these materials alone are limited and indeed additional additives are generally included. The conventional means for enhancing the fire-retardant properties of these type of compositions while retaining transparency has been the addition of soluble organic halogen additives. For example, commercial grades of LEXAN polycarbonate resin (eg. 940A, 920A) contain a combination of KSS (0.3 phr) and a tetrabromo-bisphenol/bisphenol A copolymer (0.5 phr, net 0.13 phr bromine content). Without the bromine, the 920A and 940A grades have inconsistent/unreliable performance in the UL94 VO 125 mil flammability test that these grades are designed to meet. However, the brominatedadditive is unsuitable for compositions which are required to meet "ECOs-friendly" tandards, since these standards prohibit the inclusion of bromine or chlorine based FR additives U.S. Pat. No. 3,933,734 discloses the use of monomeric or polymeric aromatic sulfonates or mixtures thereof as fire-retardant additives for polycarbonates. U.S. Pat. No. 6,353,046 issued Mar. 5, 2002 discloses that improved fireproperties can be imparted to polycarbonate resin composition by incorporating into the polycarbonate a firecomponent comprising a perfluoroalkane sulfonate, such as potassium perfluorobutane sulfonate, and a cyclic siloxane, such as octaphenylcyclotetrasiloxane.

SUMMARY OF INVENTION

It has now been surprisingly found that a combination of a potassium salt of a perfluoroalkane sulfonate and a sodium salt of toluene sulfonic acid act synergistically at low levels in polycabobnate compositions with high melt strength to provide flame-retarded polycarbonate compositions. Thus, the present invention provides a method for making a flame-retarded polycarbonate resin comprising adding to the high melt-strength polycarbonate resin an effective flame-retardant amount of a potassium salt of a perfluoroalkane sulfonate and a sodium salt of toluene sulfonic acid. Where appropriate, the melt strength of the polycarbonate is enhanced by the addition of an antidrip agent. The two salts may be formulated in advance into a composition in accordance with the invention. Use of such a composition, particularly in an aqueous carrier, results in superior fire-retardant performance.

DETAILED DESCRIPTION

The present invention provides a method for making a flame-retarded polycarbonate resin by adding to a high melt strength polycarbonate resin (for example produced by addition of an antidrip) an effective flame-retardant amount of a potassium salt of a perfluoroalkane sulfonate, aand sodium salt of toluene sulfonic acid. In a further aspect, the present invention provides a high melt strength polycarbonate resin composition with flame-retarded properties. The composition comprises a high melt strength polycarbonate resin and an effective flame-retardant amount of a potassium salt of a perfluoroalkane sulfonate and a sodium salt of toluene sulfonic acid. In still a further aspect, the invention provides a flame-retardant composition comprising a potassium salt of a perfluoroalkane sulfonate and a sodium salt of toluene sulfonic acid in a ratio which provides synergistic effectiveness as a flame-retardant additive for polycarbonate.

The polycarbonate resin used in the method and composition of the invention may be of any grade and made by any method. Thus, for example, the polycarbonate may be made via interfacial processes or by melt process (catalytic transesterification). The polycarbonate may be either branched or linear in structure, and may include functional substituents. Polycarbonate copolymers are also included within the invention. Techniques for manufacture of polycarbonates by these processes are well known, for example from U.S. Pat. Nos. 3,030,331, 3,169,121, 4,130,548, 4,286, 083, 4,552,704, 5,210,268 and 5,606,007. The polycarbonate is one which can be characterized as having high melt strength, i.e. a melt strength of at least $R^*=1.8$. $R^*$ is the viscosity ratio at 1 rad/s and at 100 rad/s measured at a temperature when the viscosity at 100 rad/s is equal to 20,000 poise. High melt strength can be an inherent property of the polycarbonate, for example as a result of a branched polycarbonate structure, or can be achieved through the addition of an antidrip agent.

The potassium salt of a perfluoroalkane sulfonate is preferably one having a to 4 carbon atoms in the alkane group. Specific, non-limiting examples of suitable compounds are potassium perfluorobutane sulfonate and potassium trifluoromethane sulfonate. The sodium salt of toluene sulfonic acid is preferably sodium toluene sulfonic acid.

In an embodiment of the method of the invention, the potassium salt of perfluoroalkane sulfonate and the sodium salt of the toluene sulfonic acid are blended with molten polycarbonate, for example in a screwe-type xtruder, and extruded and molded into parts of desired shapes. They may be added to the polycarbonate in combination, for example as a fireadditive composition comprising a potassium salt of a perfluoroalkane sulfonate and a sodium salt of toluene sulfonic acid, or sequentially in either order.

The potassium salt of the perfluoroalkane sulfonate and the sodium salt of the toluene sulfonic acid are combined with the polycarbonate resin in an effective flame-retardant amount. An effective, flame-retardant amount is one that increases the flame-resistant properties of the polycarbonate, as compared to an otherwise identical composition without the salts of a perfluoroalkane sulfonate and a toluene sulfonic acid. While the specific method for testing for flame-retardant properties is not critical, one common method that may be employed involves the formation of bars molded from extruded polycarbonate and tested using the standard Underwriters Laboratory UL 94 test method. The data may be analyzed by calculation of the average flame out time (avFOTsec), standard deviation of the flame out time (sdFOTsec) and the total number of drips, and using statistical methods to convert that data to a prediction of the probability of first time pass, or "p(FTP)" that a particular sample formulation would achieve a VO "pass" rating in the conventional UL94 testing of 5 bar.s Preferably p(FTP) will be as close to 1 as possible, for example greater than 0.9 and more preferably greater than 0.95, for maximum flameprotardant erformance in UL Testing.

In the method and polycarbonate-containing compositions of the invention, the amount of potassium salt of perfluoroalkane sulfonate is suitably low, to minimize cost, for example in the range of 0.004 to 0.05 weight %, more preferably from 0.008 to 0.03 weight %. The amount of the sodium salt of the toluene sulfonic acid is suitably from 0.001 to 0.1 weight %, more preferably from 0.005 to 0.05 weight %. Particularly preferred are combinations of at least 0.009 weight % of the potassium metal salt of perfluoroalkane sulfonate and at least 0.005 weight % of the sodium salt of the toluene sulfonic acid, for example 0.001 to 0.05% of the potassium salt of the perfluoroalkane sulfonate and 0.005 to 0.2% sodium salt of the toluene sulfonic acid.

The fire-retarded polycarbonate resins of the invention may also include an antidrip agent. As used in the specification and claims of this application, the term "antidrip" refers to an additive which increases the melt strength of the polycarbonate, thereby reducing the tendency of the resin, when heated to close to melting, to drip. Examples of suitable antidrip agents include PTFE-based antidrip agents, such as 1/1 dispersion of PTFE in styrene acrylonitrile resin, emulsion based PTFE, and steam-precipitated PTFE. The antidrip agent is added in an amount effective to increase the melt strength and reduce drip, for example in the range of from 0.05 to 0.5 weight %.

Other additives which are conventional in the art may also be added to the polycarbonate resin in the method and compositions of the invention. Such additives include but are not limited to stabilizers, mold release agents, light stabilizers, heat stabilizers, pigments, dyes, PTFE, glass fibers, and fillers.

Polycarbonate resin in accordance with the invention containing a fire-retardant comprising a potassium salt of a perfluoroalkane sulfonate and a sodium salt of toluene sulfonic acid is suitably used for making molded articles. The polycarbonate is particularly suitable for making thin walled articles, for examples articles having a wall thickness of less than 1.5 mm, i.e., 1 mm to 1.5 mm, because of its ability to achieve good fire-retardance even for thin pieces of material. These articles may be formed by extrusion, or blow molding.

The fire-retardant additive in accordance with the invention suitably comprises potassium salt of a perfluoroalkane sulfonate and a sodium salt of toluene sulfonic acid in a ratio which provides synergistic effectiveness as a flame-retardant additive for polycarbonate. For example, the composition suitably contains the potassium salt of a perfluoroalkane sulfonate and a sodium salt of toluene sulfonic acid in a ratio of from about 0.1 to 2.0 by weight, more preferably 0.18 to 1.8 by weight. This, composition is added to polycarbonate resin in an amount appropriate to achieve the levels of the individual additives described above.

The invention will now be further described with reference to the following non-limiting examples.

EXAMPLE 1

A set of experiments was performed using different formulations of polycarbonate with combinations of potassium perfluorobutane sulfonate (Rimar salt) and sodium toluene sulfonic acid (NaTS). Since the two additives were in low loading, resin powder concentrates of each were made and the same added to the formulation. The data in Table 1 indicates that the flame performance at 0.1–0.2 loading levels of NaTS is inconsistent, and thus suggests that the loadings should preferably be <0.1.

Flammability testing was conducted using the statistical "UL Tool" in which 20 bars, at the specified thickness, rather than the usual 5 bars, are burned using the UL94 test protocol and the average flame-out times and Standard Deviation (SD) of the flame-out times are calculated and subsequently converted to a numerical estimate of the probability of a first time pass "p[FTP]"value instead of the simple and less informative pass/fail criteria in UL94 testing.

All the formulations detailed in the examples of this application contain 100 parts PC resin (a blend of High Flow Linear PC and 100 Grade PC, at various ratios to cover a range of melt flow), and 0.35 phr of pentaerythrytol tetrastearate [PETS] as a mold release agent) and the indicated loading of various additives. Table 1 shows the specific formulations and the flame retardance results. Batch 2, with 0.005 RIMAR and 0.1 NaTS yields a p[FTP] value of 0.96.

TABLE 1

|  | Batch 1-1 | Batch 1-2 | Batch 1-3 | Batch 1-4 | Batch 1-5 |
| --- | --- | --- | --- | --- | --- |
| High Flow PC | 60 | 60 | 60 | 60 | 60 |
| 100 Grade PC | 40 | 40 | 40 | 40 | 40 |
| Mold Release | 0.35 | 0.35 | 0.35 | 0.35 | 0.35 |
| Heat Stabilizer | 0.03 | 0.03 | 0.03 | 0.03 | 0.03 |
| Antidrip | 0.32 | 0.32 | 0.32 | 0.32 | 0.32 |
| Rimar | 0.005 | 0.005 | 0.0075 | 0.01 | 0.01 |
| NaTS | 0.1 | 0.1 | 0.15 | 0.2 | 0.2 |
| p(FTP) @ 62 mils | 0.68 | 0.96 | 0.8 | 0.3 | 0.31 |

EXAMPLE 2

A further set of experiments was performed at very low loading of 0.009 RIMAR with 0.05 NaTS. For this experiment, both the additives were dissolved in water and the respective solution was used to make separate resin powder concentrates. As summarized in Table 2, this formulation results in a robust p[FTP] value of 0.93. In addition, the flame results indicate that increasing levels of NaTS doenot necessarily increase the fire-retardant properties.

TABLE 2

|  | Batch 2-1 | Batch 2-2 | Batch 2-3 | Batch 2-4 | Batch 2-5 |
|---|---|---|---|---|---|
| High Flow PC | 60 | 60 | 60 | 60 | 60 |
| 100 Grade PC | 40 | 40 | 40 | 40 | 40 |
| Mold Release | 0.35 | 0.35 | 0.35 | 0.35 | 0.35 |
| Heat Stabilizer | 0.03 | 0.03 | 0.03 | 0.03 | 0.03 |
| Antidrip | 0.32 | 0.32 | 0.32 | 0.32 | 0.32 |
| Rimar | 0.003 | 0.009 | 0.006 | 0.003 | 0.009 |
| NaTS | 0.05 | 0.05 | 0.08 | 0.11 | 0.11 |
| DI Water | 0.25 | 0.25 | 0.25 | 0.25 | 0.25 |
| p(FTP) @ 62 mils | 0.87 | 0.93 | 0.13 | 0.48 | 0.13 |

EXAMPLE 3

Further experiments were performed using resin powder concentrate of the individual water solution at different levels. As summarized in Table 3, in these experiments, the optimal loading of RIMAR, and NaTS was 0.01, and 0.025 respectively.

TABLE 3

|  | Batch 3-1 | Batch 3-2 | Batch 3-3 | Batch 3-4 | Batch 3-5 |
|---|---|---|---|---|---|
| High Flow PC | 60 | 60 | 60 | 60 | 60 |
| 100 Grade PC | 40 | 40 | 40 | 40 | 40 |
| Mold Release | 0.35 | 0.35 | 0.35 | 0.35 | 0.35 |
| Heat Stabilizer | 0.03 | 0.03 | 0.03 | 0.03 | 0.03 |
| Antidrip | 0.32 | 0.32 | 0.32 | 0.32 | 0.32 |
| Rimar | 0.006 | 0.01 | 0.008 | 0.006 | 0.01 |
| NaTS | 0.025 | 0.025 | 0.035 | 0.045 | 0.045 |
| DI Water | 0.4 | 0.4 | 0.4 | 0.4 | 0.4 |
| p(FTP) @ 62 mils | 0.99 | 1 | 0.55 | 0.67 | 0.23 |

EXAMPLE 4

A further set of experiments was performed in which RIMAR loading was held constant at 0.009 and the NaTS loading was varied between 0–0.03. As shown in Table 4, the data indicates that NaTS loading range of 0.005–0.05 at 0.009 RIMAR should result in p[FTP]>0.9. These results also confirms the need for both the additives being present for good FR performance at the low levels of additives used. Batch 1, which had only RIMAR at 0.009, resulted in a very low p[FTP] of 0.1067.

TABLE 4

|  | Batch 4-1 | Batch 4-2 | Batch 4-3 | Batch 4-4 | Batch 4-5 |
|---|---|---|---|---|---|
| High Flow PC | 60 | 60 | 60 | 60 | 60 |
| 100 Grade PC | 40 | 40 | 40 | 40 | 40 |
| Mold Release | 0.35 | 0.35 | 0.35 | 0.35 | 0.35 |
| Heat Stabilizer | 0.05 | 0.05 | 0.05 | 0.05 | 0.05 |
| Antidrip | 0.35 | 0.35 | 0.35 | 0.35 | 0.35 |
| Rimar | 0.009 | 0.009 | 0.009 | 0.009 | 0.009 |
| NaTS | 0 | 0.005 | 0.01 | 0.02 | 0.03 |
| p(FTP) @ 62 mils | 0.1067 | 0.913 | 0.947 | 0.963 | 0.86 |

EXAMPLE 5

A further set of experiments was performed in which the NaTS loading was held constant at 0.015 and the RIMAR loading was varied. These experiments again confirmed the need for both the additives to achieve p[FTP]>0.9 at the low concentrations used. The minimum amount of RIMAR required in these experiments to achieve p[FTP]>0.9 was 0.006 and that of NaTS is 0.015

TABLE 5

|  | Batch 5-1 | Batch 5-2 | Batch 5-3 | Batch 5-4 | Batch 5-5 | Batch 5-6 | Batch 5-7 |
|---|---|---|---|---|---|---|---|
| High Flow PC | 60 | 60 | 60 | 60 | 60 | 60 | 60 |
| 100 Grade PC | 40 | 40 | 40 | 40 | 40 | 40 | 40 |
| Mold Release | 0.35 | 0.35 | 0.35 | 0.35 | 0.35 | 0.35 | 0.35 |
| Heat Stabilizer | 0.05 | 0.05 | 0.05 | 0.05 | 0.05 | 0.05 | 0.05 |
| Antidrip | 0.35 | 0.35 | 0.35 | 0.35 | 0.35 | 0.35 | 0.35 |
| Rimar | 0 | 0.003 | 0.006 | 0.009 | 0.015 | 0.026 | 0.045 |
| NaTS | 0.015 | 0.015 | 0.015 | 0.015 | 0.015 | 0.015 | 0.015 |
| p(FTP) @ 62 mils | 0.071 | 0.4355 | 0.908 | 0.999 | 0.999 | 0.999 | 1 |

EXAMPLE 6

Further experiments were performed in which a higher amount of High Flow resin was used. The melt flows ranged from 14.3–15.3. Further for Batch 1, both RIMAR and NaTS were dissolved together in water and then blended in resin powder to form the concentrate. This was done for ease of extrusion process if this were to run on a manufacturing scale. This also allows the use of very small amount of both the additives, thus making it economically more attractive. In batches 25 the two additives were added separately in the powder form. The results are summarized in Table 6. As shown, batch 1, in which the Rimar and NaTs were premixed exhibited much better fire retardant properties at much lower levels.

TABLE 6

|  | Batch 6-1 | Batch 6-2 | Batch 6-3 | Batch 6-4 | Batch 6-5 |
|---|---|---|---|---|---|
| High Flow PC | 65 | 65 | 65 | 65 | 65 |
| 100 Grade PC | 35 | 35 | 35 | 35 | 35 |
| Mold Release | 0.35 | 0.35 | 0.35 | 0.35 | 0.35 |
| Heat Stabilizer | 0.05 | 0.05 | 0.05 | 0.05 | 0.05 |
| Antidrip | 0.35 | 0.35 | 0.35 | 0.35 | 0.35 |
| Rimar |  | 0.02 | 0.03 | 0.04 | 0.05 |
| NaTS |  | 0.015 | 0.015 | 0.015 | 0.015 |
| Rimar + NaTS Mixt.* | 4 |  |  |  |  |
| Melt Flow | 14.34 | 15.25 | 15.32 | 15.24 | 15.24 |
| p(FTP) | 0.958 | 0.1 | 0.204 | 0.808 | 0.527 |

(*2.25 g RIMAR + 3.75 g NaTS in 1 kg Powder = 0.009 RIMAR, and 0.015 NaTS)

EXAMPLE 7

Since the flame performance for the Rimar, NaTS combination was so robust at 62 mils, it was desirable to confirm if it was equally robust at a lower gauge of 45 mils. As shown below in Table 7, flame performance for this thickness measured at two melt flows, namely 940, Batch 7-1 (melt flow range 8–12) and 920, Batch 2 (melt flow range 12–16) were very good with p[FTP] values of 0.97, and 0.96, respectively. These formulations also showed robust 5V performance at 125 mils.

TABLE 7

|  | Batch 7-1 | Batch 7-2 |
|---|---|---|
| High Flow PC | 40 | 60 |
| 100 Grade PC | 60 | 40 |
| Mold Release | 0.35 | 0.35 |
| Heat Stabilizer | 0.05 | 0.05 |
| Antidrip | 0.45 | 0.45 |
| Rimar Salt | 0.012 | 0.012 |
| NaTS | 0.015 | 0.015 |
| DI Water | 0.3 | 0.3 |
| p(FTP) @ 45 mils | 0.97 | 0.96 |
| 5V @ 125 mils | Pass | Pass |

In the above two formulations both the salts were dissolved in water and the same was dispersed in the formulation. It seems the synergistic activity of both the salts is enhanced when first dissolved together in water. It is not exactly understood how this enhancement in flame retardant activity occurs. Although not intending to be bound by any specific mechanism, one may hypothesize that by dissolving both the salts together in water results in complexation of both the salts which has a superior flame retardant synergist activity compared to the synergist activity of them when dispersed individually as water solutions in the resin powder.

EXAMPLE 8

The next step was to confirm if the combination of NaTS with potassium trifluoromethane sulfonate (Triflate, C1 salt) was as good as the NaTS+Rimar combination. Since the Rimar+NaTS combination gave good flame performance at loading of 0.009 RIMAR, the same amount was used for C1 salt since the C1 salt is structurally similar to Rimar salt. The amount of NaTS was varied as shown below in Table 8. For all the following formulations, flame performance was measured at 45 mils.

TABLE 8

|  | Batch 8-1 | Batch 8-2 | Batch 8-3 | Batch 8-4 | Batch 8-5 |
|---|---|---|---|---|---|
| High Flow PC | 40 | 40 | 40 | 40 | 40 |
| 100 Grade PC | 60 | 60 | 60 | 60 | 60 |
| Mold Release | 0.35 | 0.35 | 0.35 | 0.35 | 0.35 |
| Heat Stabilizer | 0.05 | 0.05 | 0.05 | 0.05 | 0.05 |
| Antidrip | 0.45 | 0.45 | 0.45 | 0.45 | 0.45 |
| Triflate-C1 Salt | 0.009 | 0.009 | 0.009 | 0.009 | 0.009 |
| NaTS | 0 | 0.004 | 0.008 | 0.012 | 0.016 |
| DI Water | 0.2 | 0.2 | 0.2 | 0.2 | 0.2 |
| p(FTP) @ 45 mils | 0.003 | 0.057 | 0.172 | 0.715 | 0.765 |

EXAMPLE 9

Since the C1 salt was at a constant level in Example 8, the next step was keeping NaTS constant and varying the amount of C1 salt as shown in Table 9. These experiments confirm that the combination of C1 salt with NaTS also yields robust flame retardant activity.

TABLE 9

|  | Batch 9-1 | Batch 9-2 | Batch 9-3 | Batch 9-4 | Batch 9-5 |
|---|---|---|---|---|---|
| High Flow PC | 40 | 40 | 40 | 40 | 40 |
| 100 Grade PC | 60 | 60 | 60 | 60 | 60 |
| Mold Release | 0.35 | 0.35 | 0.35 | 0.35 | 0.35 |
| Heat Stabilizer | 0.05 | 0.05 | 0.05 | 0.05 | 0.05 |
| Antidrip | 0.45 | 0.45 | 0.45 | 0.45 | 0.45 |
| Triflate-C1 Salt | 0 | 0.006 | 0.009 | 0.012 | 0.015 |
| NaTS | 0.012 | 0.012 | 0.012 | 0.012 | 0.012 |
| DI Water | 0.2 | 0.2 | 0.2 | 0.2 | 0.2 |
| p(FTP) @ 45 mils | 0.007 | 0.568 | 0.913 | 0.936 | 0.953 |

What is claimed is:

1. A method for making a flame-retarded polycarbonate resin comprising the step of adding to a high melt strength polycarbonate resin an effective flame-retardant amount of a combination of a potassium salt of a perfluoroalkane sulfonate and a sodium salt of toluene sulfonic acid in a ratio which provides synergistic effectiveness as a flame-retardant additive.

2. The method of claim 1, wherein the high melt strength polycarbonate resin comprises an antidrip agent.

3. The method of claim 2, wherein the potassium salt of a perfluoroalkane sulfonate comprises a 1 to 4 carbon alkane group.

4. The method of claim 3, wherein the potassium salt of a perfluoroalkane sulfonate is potassium perfluorobutane sulfonate and the sodium salt of toluene sulfonic acid is sodium toluene sulfonic acid.

5. The method of claim 4, wherein the potassium perfluorobutane sulfonate is added to the polycarbonate resin in an amount of from 0.005 to 0.05 weight %.

6. The method of claim 3, wherein the potassium salt of a perfluoroalkane sulfonate is potassium trifluoromethane sulfonate and the sodium salt of toluene sulfonic acid is sodium toluene sulfonic acid.

7. The method of claim 6, wherein the potassium trifluoromethane sulfonate is added to the polycarbonate resin in an amount of from 0.005 to 0.05 weight %.

8. The method of claim 2, wherein the sodium salt of toluene sulfonic acid is sodium toluene sulfonic acid.

9. The method of claim 8, wherein the sodium toluene sulfonic acid is added in an amount of from 0.005 to 0.1 weight %.

10. The method of claim 9, wherein the potassium salt of a perfluoroalkane sulfonate comprises a 1 to 4 carbon alkane group.

11. The method of claim 10, wherein the potassium salt of a perfluoroalkane sulfonate is potassium perfluorobutane sulfonate.

12. The method of claim 11, wherein the potassium perfluorobutane sulfonate is added to the polycarbonate resin in an amount of from 0.005 to 0.05 weight %.

13. The method of claim 10, wherein the potassium salt of a perfluoroalkane sulfonate is potassium trifluoromethane sulfonate.

14. The method of claim 13, wherein the potassium trifluoromethane sulfonate is added to the polycarbonate resin in an amount of from 0.005 to 0.05 weight %.

15. The method of claim 2, wherein the potassium salt of a perfluoroalkane sulfonate and the sodium salt of toluene sulfonic acid are added together as a flame-retardant composition.

16. The method of claim 15, wherein the potassium salt of a perfluoroalkane sulfonate comprises a 1 to 4 carbon alkane group.

17. The method of claim 16, wherein the potassium salt of a perfluoroalkane sulfonate is potassium perfluorobutane sulfonate and the sodium salt of toluene sulfonic acid is sodium toluene sulfonic acid.

18. The method of claim 17, wherein the potassium perfluorobutane sulfonate is added to the polycarbonate resin in an amount of from 0.005 to 0.05 weight %.

19. The method of claim 16, wherein the potassium salt of a perfluoroalkane sulfonate is potassium trifluoromethane sulfonate and the sodium salt of toluene sulfonic acid is sodium toluene sulfonic acid.

20. The method of claim 19, wherein the potassium trifluoromethane sulfonate is added to the polycarbonate resin in an amount of from 0.005 to 0.05 weight %.

21. The method of claim 15, wherein the sodium salt of toluene sulfonic acid is sodium toluene sulfonic acid.

22. The method of claim 21, wherein the sodium toluene sulfonic acid is added in an amount of from 0.005 to 0.1 weight %.

23. The method of claim 22, wherein the potassium salt of a perfluoroalkane sulfonate comprises a 1 to 4 carbon alkane group.

24. The method of claim 23, wherein the potassium salt of a perfluoroalkane sulfonate is potassium perfluorobutane sulfonate.

25. The method of claim 24, wherein the potassium perfluorobutane sulfonate is added to the polycarbonate resin in an amount of from 0.005 to 0.05 weight %.

26. The method of claim 23, wherein the potassium salt of a perfluoroalkane sulfonate is potassium trifluoromethane sulfonate.

27. The method of claim 26, wherein the potassium trifluoromethane sulfonate is added to the polycarbonate resin in an amount of from 0.005 to 0.05 weight %.

28. The method of claim 15, wherein the flame-retardant composition comprises the potassium salt of a perfluoroalkane sulfonate and the sodium salt of toluene sulfonic acid in an aqueous carrier.

29. The method of claim 28, wherein the potassium salt of a perfluoroalkane sulfonate comprises a 1 to 4 carbon alkane group.

30. The method of claim 27, wherein the potassium salt of a perfluoroalkane sulfonate is potassium perfluorobutane sulfonate and the sodium salt of toluene sulfonic acid is sodium toluene sulfonic acid.

31. The method of claim 30, wherein the potassium perfluorobutane sulfonate is added to the polycarbonate resin in an amount of from 0.005 to 0.05 weight %.

32. The method of claim 29, wherein the potassium salt of a perfluoroalkane sulfonate is potassium trifluoromethane sulfonate and the sodium salt of toluene sulfonic acid is sodium toluene sulfonic acid.

33. The method of claim 32, wherein the potassium trifluoromethane sulfonate is added to the polycarbonate resin in an amount of from 0.005 to 0.05 weight %.

34. The method of claim 28, wherein the sodium salt of toluene sulfonic acid is sodium toluene sulfonic acid.

35. The method of claim 34, wherein the sodium toluene sulfonic acid is added in an amount of from 0.005 to 0.1 weight %.

36. The method of claim 35, wherein the potassium salt of a perfluoroalkane sulfonate comprises a 1 to 4 carbon alkane group.

37. The method of claim 36, wherein the potassium salt of a perfluoroalkane sulfonate is potassium perfluorobutane sulfonate.

38. A composition comprising a high melt strength polycarbonate resin and an effective flame-retardant amount of a potassium salt of a perfluoroalkane sulfonate and a sodium salt of toluene sulfonic acid in a ratio which provides synergistic effectiveness as a flame-retardant additive.

39. The composition of claim 38, wherein the potassium salt of a perfluoroalkane sulfonate comprises a 1 to 4 carbon alkane group.

40. The composition of claim 39, wherein the potassium salt of a perfluoroalkane sulfonate is potassium perfluorobutane sulfonate.

41. The composition of claim 40, wherein the potassium perfluorobutane sulfonate is added to the polycarbonate resin in an amount of from 0.005 to 0.05 weight %.

42. The composition of claim 39, wherein the potassium salt of a perfluoroalkane sulfonate is potassium trifluoromethane sulfonate.

43. The composition of claim 42, wherein the potassium trifluoromethane sulfonate is added to the polycarbonate resin in an amount of from 0.005 to 0.05 weight %.

44. The composition of claim 38, wherein the sodium salt of toluene sulfonic acid is sodium toluene sulfonic acid.

45. The composition of claim 44, wherein the sodium toluene sulfonic acid is added in an amount of from 0.005 to 0.05 weight %.

46. The composition of claim 45, wherein the potassium salt of a perfluoroalkane sulfonate comprises a 1 to 4 carbon alkane group.

47. The composition of claim 46, wherein the potassium salt of a perfluoroalkane sulfonate is potassium perfluorobutane sulfonate.

48. The composition of claim 47, wherein the potassium perfluorobutane sulfonate is added to the polycarbonate resin in an amount of from 0.005 to 0.05 weight %.

49. The composition of claim 48, wherein the potassium salt of a perfluoroalkane sulfonate is potassium trifluoromethane sulfonate.

50. The composition of claim 49, wherein the potassium trifluoromethane sulfonate is added to the polycarbonate resin in an amount of from 0.005 to 0.05 weight %.

51. The composition of claim 45, wherein the potassium salt of a perfluoroalkane sulfonate comprises a 1 to 4 carbon alkane group.

52. The composition of claim 51, wherein the potassium salt of a perfluoroalkane sulfonate is potassium perfluorobutane sulfonate.

53. The composition of claim 52, wherein the potassium perfluorobutane sulfonate is added to the polycarbonate resin in an amount of from 0.005 to 0.05 weight %.

54. The composition of claim 51, wherein the potassium salt of a perfluoroalkane sulfonate is potassium trifluoromethane sulfonate.

55. The composition of claim 54, wherein the potassium trifluoromethane sulfonate is added to the polycarbonate resin in an amount of from 0.005 to 0.05 weight %.

56. The composition of claim 38, further comprising an antidrip agent.

57. A fire-retardant additive comprising a potassium salt of a perfluoroalkane sulfonate and a sodium salt of toluene sulfonic acid in a ratio which provides synergistic effectiveness as a flame-retardant additive for high melt strength polycarbonate.

58. The additive of claim 57, wherein the potassium salt of a perfluoroalkane sulfonate and the sodium salt of toluene sulfonic acid are present in a ratio of from about 0.1 to 2.0 by weight.

59. The additive of claim 58, wherein the potassium salt of a perfluoroalkane sulfonate and the sodium salt of toluene sulfonic acid are present in a ratio of from about 0.18 to 1.8 by weight.

60. The additive of claim 57, wherein the potassium salt of a perfluoroalkane sulfonate has a 1 to 4 carbon alkane group.

61. The additive of claim 60, wherein the potassium salt of a perfluoroalkane sulfonate is potassium perfluorobutane sulfonate.

62. The additive of claim 60, wherein the potassium salt of a perfluoroalkane sulfonate is potassium trifluoromethane sulfonate.

63. The additive of claim 57, wherein the sodium salt of toluene sulfonic acid is sodium toluene sulfonic acid.

64. The additive of claim 63, wherein the potassium salt of a perfluoroalkane sulfonate has a 1 to 4 carbon alkane group.

65. The additive of claim 64, wherein the potassium salt of perfluoroalkane sulfonate is potassium perfluorobutane sulfonate.

66. The additive of claim 65, wherein the potassium salt of a perfluoroalkane sulfonate and the sodium salt of toluene sulfonic acid are present in a ratio of from about 0.1 to 2.0 by weight.

67. The additive of claim 65, wherein the potassium salt of a perfluoroalkane sulfonate and the sodium salt of toluene sulfonic acid are present in a ratio of from about 0.18 to 1.8 by weight.

68. The additive of claim 64, wherein the potassium salt of perfluoroalkane sulfonate is potassium trifluoromethane sulfonate.

69. The additive of claim 68, wherein the potassium salt of a perfluoroalkane sulfonate and the sodium salt of toluene sulfonic acid are present in a ratio of from about 0.1 to 2.0 by weight.

70. The additive of claim 68, wherein the potassium salt of a perfluoroalkane sulfonate and the sodium salt of toluene sulfonic acid are present in a ratio of from about 0.18 to 1.8 by weight.

71. The additive of claim 57, wherein the additive comprises the potassium salt of a perfluoroalkane sulfonate and the sodium salt of toluene sulfonic acid in an aqueous carrier.

72. The additive of claim 71, wherein the potassium salt of a perfluoroalkane sulfonate and the sodium salt of toluene sulfonic acid are present in a ratio of from about 0.1 to 2.0 by weight.

73. The additive of claim 71, wherein the potassium salt of a perfluoroalkane sulfonate and the sodium salt of toluene sulfonic acid are present in a ratio of from about 0.18 to 1.8 by weight.

74. The additive of claim 71, wherein the potassium salt of a perfluoroalkane sulfonate is potassium perfluorobutane sulfonate and the sodium salt of toluene sulfonic acid is sodium toluene sulfonic acid.

75. The additive of claim 57, further comprising an antidrip agent.

* * * * *